July 12, 1938. B. GRANBERG ET AL 2,123,530

MACHINE TOOL

Filed April 19, 1934 6 Sheets-Sheet 1

INVENTORS:
Bengt Granberg
and Fred R. Swanson
BY
ATTORNEY

July 12, 1938.  B. GRANBERG ET AL  2,123,530
MACHINE TOOL
Filed April 19, 1934  6 Sheets-Sheet 2

INVENTORS:
Bengt Granberg
and Fred R. Swanson
BY
ATTORNEY

INVENTORS:
Bengt Granberg
and Fred R. Swanson
BY
ATTORNEY

July 12, 1938.  B. GRANBERG ET AL  2,123,530
MACHINE TOOL
Filed April 19, 1934   6 Sheets-Sheet 4

INVENTORS
Bengt Granberg
and Fred R. Swanson
BY
ATTORNEY

Patented July 12, 1938

2,123,530

UNITED STATES PATENT OFFICE 2,123,530

MACHINE TOOL

Bengt Granberg and Fred R. Swanson, Rockford, Ill., assignors to Sundstrand Machine Tool Co., Rockford, Ill., a corporation of Illinois Application April 19, 1934, Serial No. 721,304

27 Claims. (Cl. 90—21)

More particularly this invention relates to milling machines and mechanism for actuating the tool and work supports thereof.

It is the general object of the invention to provide a new and improved milling machine.

Other and ancillary objects are to provide such a milling machine having a simple and rigid supporting frame, a vertically movable head, together with novel mechanism for clamping the head, a simple and efficient mechanism for driving the tool arbor, a new and improved mechanism for actuating the table, and novel means for controlling the movements of the table both manually and automatically.

Another object is to provide a milling machine having the actuating mechanism for the tool and work supports assembled in units which may be disconnected and removed from the machine independently of each other for the purpose of inspection and servicing.

Further objects will become readily apparent from the following detailed description taken in connection with the accompanying drawings, in which.

For purposes of disclosure a preferred embodiment of the invention is illustrated in the drawings and hereinafter described in detail, with the understanding that it is not intended to limit the invention to the particular construction and arrangement shown, it being contemplated that various changes may be made by those skilled in the art without departing from the spirit and scope of the invention as expressed in the appended claims.

Referring to the drawings, the invention is embodied in a milling machine comprising generally a bed or base 30, a column 31 extending upwardly from the rear portion of the base, a saddle or head 32 slidably mounted on the upper portion of the column, an overarm 33 extending forwardly from the head 32 and across the base 30, a table 34 slidably mounted on the base, a spindle 35 rotatably mounted in the head 32, a cutter arbor 36 extending from the spindle 35, supporting members 37 and 38 carried on the overarm 33 and having bearings for supporting the arbor 36, and a supporting brace 39 secured at its lower end to the base and at its upper end to the member 38.

Adjustable head

Figure 1:
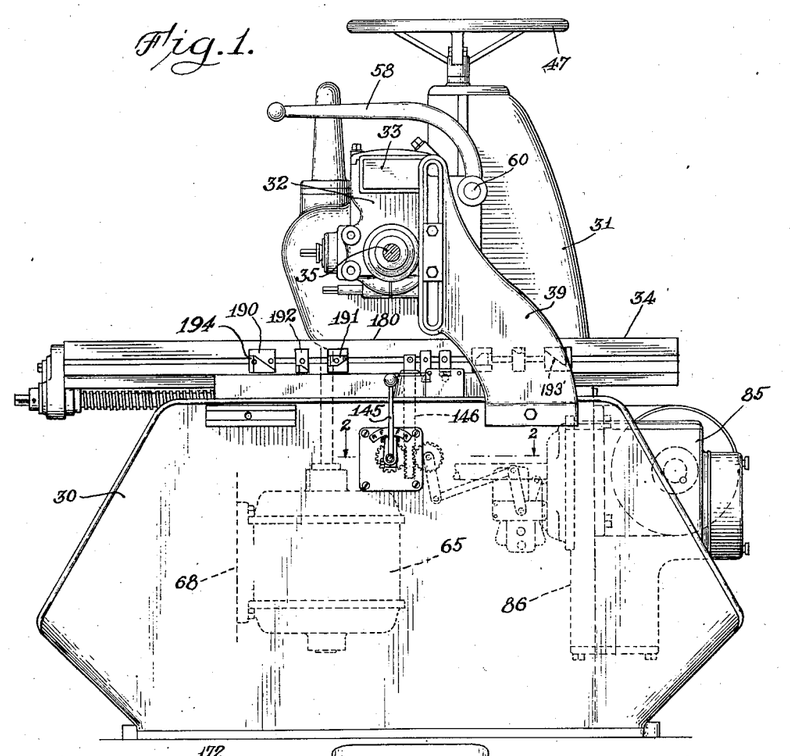
Fig. 1 is a front elevation of a preferred form of the invention.
Figures 4, 5:
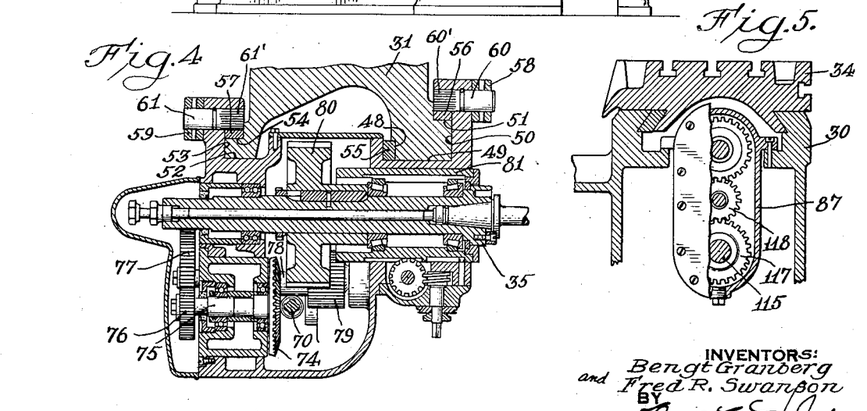
Fig. 4 is a fragmentary section along the line 4—4 of Fig. 3.
Fig. 5 is a fragmentary section along the line 5—5 of Fig. 9.

The head 32 is arranged to be adjusted vertically by means of a screw 45 which is rotatably mounted in the upper portion of the column and engages a nut 46 (Fig. 6), secured to the head 32. A hand wheel 47 is secured to the upper end of the screw 45 to facilitate adjustment of the head. As illustrated in Fig. 4, the column 31 is preferably provided with vertically extending ways 48, 49, 50 and 51 adjacent the table, and vertically extending ways 52, 53 and 54 at the rear of the column. Ways 49 and 50, and 52 and 53, are engaged by corresponding surfaces on the head 32, tapered gibs 55, 56 and 57 being positioned intermediate the remaining ways and adjacent surfaces on the head. The gib 55 is preferably given a somewhat permanent adjustment, whereas the gibs 56 and 57 are arranged to be actuated for the purpose of clamping and unclamping the head to and from the column. In the preferred form of the invention the gibs 56 and 57 are arranged to be moved longitudinally by means of handles 58 and 59 which extend over the head to the left-hand side of the machine as illustrated in Fig. 1. These handles are mounted on short shafts 60 and 61 which are rotatably mounted on the head 32 and have pinion portions 60' and 61' engaging rack teeth formed on the gibs. Thus by raising and lowering the outer ends of the handles the gibs may be loosened and tightened.

Spindle driving mechanism

Figures 6, 7, 8:
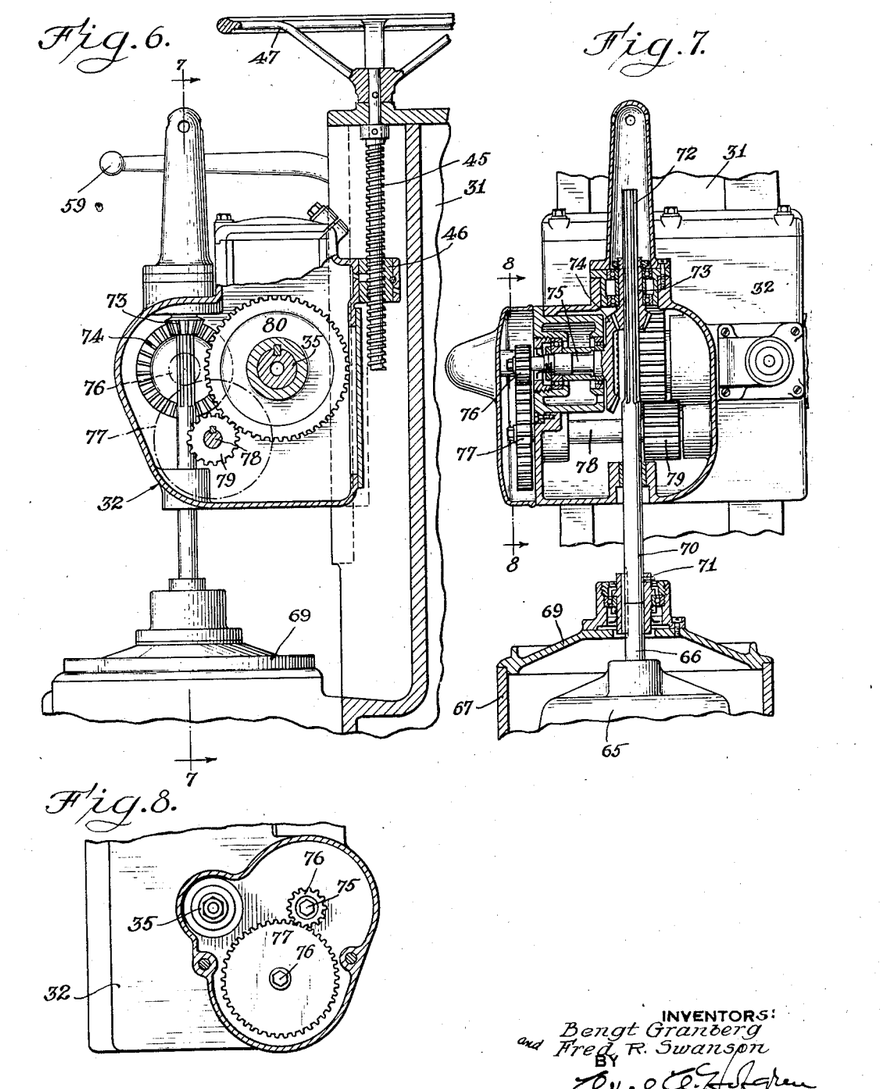
Fig. 6 is a fragmentary vertical section along the line 6—6 of Fig. 3.
Fig. 7 is a fragmentary vertical section along the line 7—7 of Fig. 6.
Fig. 8 is a fragmentary section along the line 8—8 of Fig. 7.

In the present form of the invention the spindle 35 is arranged to be driven by an electric motor 65 (Figs. 1, 2, 6 and 7) mounted with its shaft 66 in a vertical position. The motor is positioned in a casing 67 mounted on the column 31 and is supported by means of a bracket 68 depending from the cover 69 of the casing. The upper end of the motor shaft, as illustrated most clearly in Fig. 7, is coupled to the lower end of a shaft 70 by means of a splined coupling 71. The upper end of the shaft 70 has a plurality of splines 72 and extends through a correspondingly grooved bevel gear 73 which is rotatably mounted on the head 32, the spline connection permitting the head to be adjusted vertically without disengaging the shaft 70 from the bevel gear. The driving connections between the shaft 70 and the spindle include the bevel gear 73 and a bevel gear 74 mounted on a horizontal shaft 75, pick-off gears 76 and 77 secured to the adjacent ends of the shaft 75 and a parallel shaft 78, and a wide pinion 79 on the shaft 78 meshing with a wide gear 80 keyed to the spindle 35. As shown most clearly in Fig. 4 the spindle is rotatably mounted in a longitudinally adjustable sleeve or quill 81, the pinion 79 and gear 80 being made unusually wide so as to permit the quill to be adjusted longitudinally without disengaging said pinion and gear.

Table actuating mechanism

The table 34 is arranged to be reciprocated at feed and traverse rates by means of a reversible electric motor 85, feed-traverse gearing located in a casing 86 (Figs. 1 and 9 to 12), a rotatable nut and connecting gearing located in a casing 87 (Figs. 5 and 9), and a feed screw 88 non-rotatably mounted on the table.

Figures 9, 10, 11, 12, 13, 14, 15:
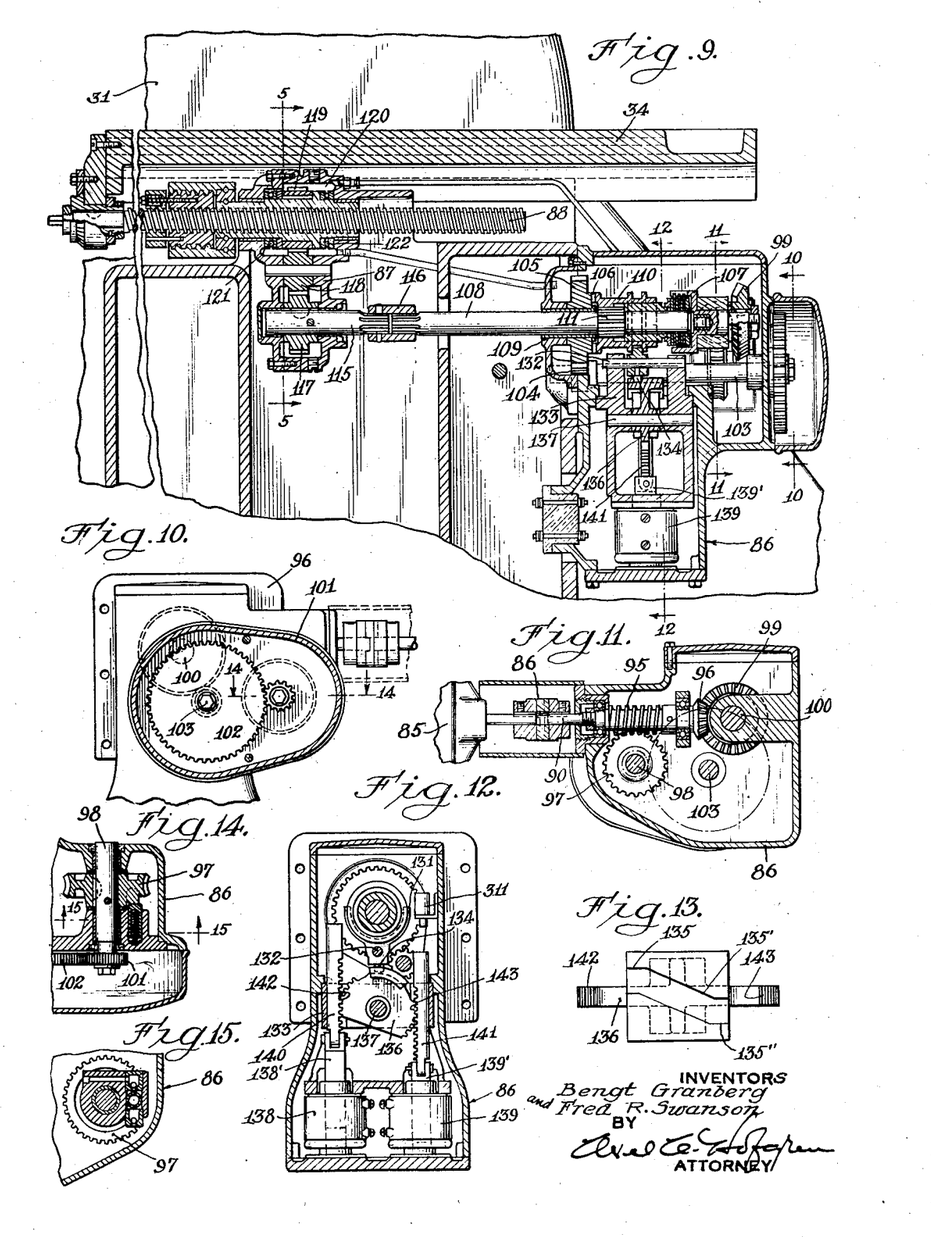
Fig. 9 is a fragmentary section along the line 9—9 of Fig. 3.
Fig. 10 is a section along the line 10—10 of Fig. 9.
Fig. 11 is a section along the line 11—11 of Fig. 9.
Fig. 12 is a section along the line 12—12 of Fig. 9.
Fig. 13 is an enlarged peripheral view showing the control cam on a gear in Fig. 12.
Fig. 14 is a section along the line 14—14 of Fig. 10.
Fig. 15 is a section along the line 15—15 of Fig. 14.

The feed-traverse gearing comprises a driven shaft 90 connected to the shaft of motor 85 by means of a coupling 86. The shaft 90 carries a worm 95 (Fig. 11) and also a bevel pinion 96, the worm meshing with a worm wheel 97 on a shaft 98, and the bevel pinion 96 meshing with a bevel gear 99 on a shaft 100 extending parallel to the worm shaft 98. The worm and worm wheel are included in a feed drive, a pick-off gear 101 on the shaft 98 meshing with a corresponding pick-off gear 102 on a shaft 103. On its inner end (Fig. 9) the shaft 103 carries a pinion 104 meshing with a feed gear 105 having feed clutch teeth 106 thereon. The bevel gears 96 and 99 are included in a "traverse" drive, the shaft 100 being formed integrally with one element 107 of a friction type traverse clutch. A feed-traverse shaft 108 is mounted concentrically with the feed gear 105 and the shaft 100 and, as illustrated in Fig. 9, extends through a sleeve 109 on which the feed gear 105 is rotatably mounted through a clutch shifting member 110 and through the disks of the friction traverse clutch. The shaft 108 has a splined portion 111 on which the clutch shifting member 110 is slidably mounted so as to be driven with the shaft. By moving the clutch member 110 toward the left (Fig. 9) the shaft 108 is driven at a feed rate from the feed gear 105, whereas by shifting the clutch member 110 toward the right the shaft 108 is driven at a traverse rate from the shaft 100.

The shaft 108 is connected to a concentric shaft 115 (Figs. 5 and 9) by means of a splined coupling 116 which is pinned to the shaft 115. The shaft 115 is rotatably mounted in the lower portion of the casing 87 and has a spur gear 117 keyed thereto. This gear meshes with an intermediate gear 118 which in turn meshes with a gear 119 secured to a rotating nut 120. The nut 120 is rotatably mounted in the upper portion of the casing 87 by means of ball bearings 121 and 122, and is in screw threaded engagement with the feed screw 88.

Control mechanism

As mentioned hereinbefore, the motor 85 is arranged to be reversed for the purpose of reversing the table and is arranged to be started and stopped for the purpose of starting and stopping the table. Preferably the starting, stopping and reversing of this motor and also the shifting of the feed-traverse clutch 110 is accomplished electrically, mechanism being provided for starting the table manually and for changing the speed, reversing and stopping the table either manually or automatically.

The means for shifting the clutch member 110 is herein shown as comprising a yoke 131 (Figs. 9 and 12) which is slidably mounted on a rod 132 supported on a bracket 133 in the casing 86. A pin 134 extends downwardly from the yoke 131 and engages in a cam slot 135 (Fig. 13) formed on the periphery of an oscillatory disk 136 which is mounted on a shaft 137. The cam slot 35 has a diagonal intermediate portion and parallel end portions 135' and 135'', so that when the disk 136 is oscillated in one direction the pin 134 is moved into one end portion of the slot to engage one of the clutches, and when the disk is oscillated in the other direction the pin is moved into the opposite end portion of the slot to engage the other clutch. The disk 136 is arranged to be oscillated by means of electrically operated power means, herein shown as comprising solenoids 138 and 139. These solenoids have armatures 138' and 139' connected respectively to rack members 140 and 141 which are slidably mounted in the bracket 133 and engage segmental gears 142 and 143 formed on the disk 136. In the exemplary embodiment of the invention, the clutch member 110 is engaged to feed the table when the solenoid 139 is energized, so that this solenoid may be referred to as the "feed" solenoid, the solenoid 138 then being the "traverse" solenoid.

The control mechanism embodies a manual control handle 145 and an automatically or dog operated control element in the form of a vertically movable member 146 (Figs. 1, 2, 3, 16 and 18). The control mechanism is illustrated diagrammatically in Fig. 20. Preferably the control mechanism includes the trip mechanism positioned adjacent the table, and an electrically operated switch gear which may be mounted on a panel in a compartment in the rear portion of the base. Furthermore, the control mechanism, as hereinafter more fully described, has readily adjustable means including switch devices, which may be effective to cause the work support to be reciprocated continuously or to cause the work support to be stopped after movement in a forward and return direction, and in such movements, the feed and traverse rates of movement may be alternated at will in either direction of movement. Thus, in addition to the flexibility provided in the actuation of the work support by the mechanism hereinbefore described, the invention also provides for marked flexibility in the operation of the control mechanism and is readily adapted for convenient modification to meet various operating requirements.

Figure 20:
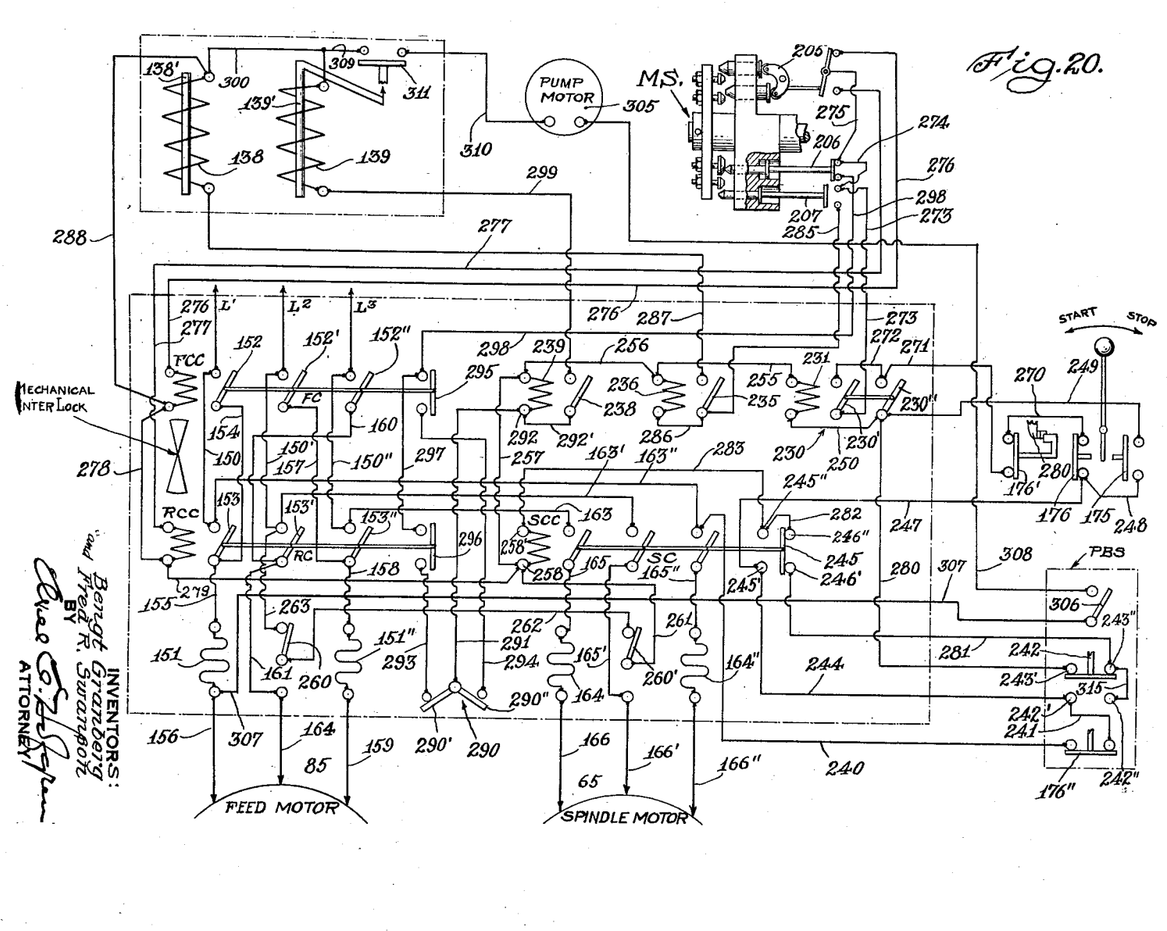
Fig. 20 is a wiring diagram.

Referring more particularly to Fig. 20, L—1, L—2 and L—3 represent the line wires of a three-phase alternating current circuit from which power is derived for operating the spindle motor 65 and the feed motor 85. The feed motor is arranged to be connected to the line wires either through a three-pole "forward" contactor FC operable by means of a coil FCC or a three-pole "reverse" contactor RC operable by means of a coil RCC. Preferably a mechanical interlock device of suitable form is provided so as to prevent both contactors from being closed simultaneously. Since the construction of such contactors is well known in the art, it is believed unnecessary to describe the mechanical structure thereof in further detail.

The line wires are connected directly to stationary contacts of the forward contactor, the stationary contacts of the reverse contactor being connected to the line wires by means of connections 150, 150' and 150". The movable elements of the contactors are connected to the feed motor 85, overload relays having coils 151 and 151" being preferably inserted in two phases. As illustrated herein, the first line element 152 of the forward contactor and the first line element 153 of the reverse contactor are connected together by means of a connection 154, and to motor 85 by connections 155 and 156 and the overload relay coil 151. The second line element 152' of the forward contactor and the third line element 153" of the reverse contactor are connected together by a wire 157, and to the motor by means of connections 158 and 159 and the overload relay coil 151". The third line element 152" of the forward contactor is connected to the second line element 153' of the reverse contactor by a wire 160 and both are connected to the motor by means of connections 161 and 162. Thus, it will be apparent that when the forward contactor is closed the motor will be driven in one direction, and when the reverse contactor is closed the motor will be driven in the opposite direction.

The spindle motor 65 is arranged to be connected to the line wires through a three-pole contactor SC operable by means of a coil SCC. The stationary contacts of the spindle contactor SC are connected by connections 163, 163' and 163" to the stationary contacts of the reverse contactor RC, and the connections of the movable elements to the spindle motor 65 preferably include overload relays having coils 164, 164". As shown, the first line element of the spindle contactor SC is connected to the motor by connections 165 and 166, and overload relay coil 164, while the third line element is connected to the motor by connections 165" and 166", and overload relay 164". Connections 165' and 166' connect the second line element to the spindle motor.

In the preferred form of the invention the movements of the work support are arranged to be controlled by switch gear which may be operated either manually by shifting the manual control handle 145 or automatically by dogs carried by the support and acting on the vertically movable control member 146. Preferably the support movement is in each instance initiated by actuation of the manual control handle, which may also be employed to stop the support movement. To this end the manual control handle 145 (Figs. 1, 2, 3, 16, 18 and 20) is pivotally mounted on the outer end of a sleeve 168 which is journaled rotatably in the upper forward side of the base, and the handle 145 is arranged in its pivotal movement to reciprocate a switch actuating rod 169 which is slidable through the sleeve 168. Between suitable space abutments on the projecting inner end of the rod 169, a pair of space flanged collars 170, 170' are slidably mounted, so as to be held against their abutments by an intermediate coil spring 171. The collar 170 at one end of the rod 169 may also abut the inner end of the sleeve 168, while the collar 170' may abut a yoke 172, so that the spring 171 acts through the two collars to return the rod to the centered position of Fig. 2 after actuation of the rod.

Mounted on the yoke 172 between the collars 170 and 170' are a starting switch 175 and a stop switch 176 adapted for selective actuation by the collars when the rod 169 is actuated in opposite directions. The switches are of the push button type having a casing 177 enclosing a pair of movable contacts which are actuated by inward movement of a normally projecting button 178. The starting switch 175 is normally open and is adapted to be closed by rearward movement of the rod 169 to close a motor-starting circuit to certain of the contactor coils as will hereinafter be described in detail. The stop switch 176 is normally closed and when opened by forward actuation of the rod 169 breaks a holding circuit (to be described in detail hereinafter) to the contactor coils FCC, RCC and SCC, and thereby causes the actuating motors to stop.

Similar normally closed stop switches 176' and 176" are also included in said holding circuit, the switch 176' being located on the bed adjacent to the forward edge of the table, and adapted to be opened by suitable stop dogs 180 adjustably mounted on the forward edge of the table. In the present instance the dogs 180 are adapted to act in one direction only and accordingly are provided with pivoted lower ends 181 in a conventional manner so as to render each dog effective in one direction only. The pivoted portions 181 of the stop dogs are arranged to act on a horizontal plunger 182 mounted in the base and connected to a link 183 which in the movement of the plunger by one of the dogs 180 is adapted to engage the push button of the switch 176' to open the same. The stop switch 176" may be located in a remote position such as a push button station or panel PBS for convenient manual actuation to stop the machine.

Figures 1A, 2, 2A:
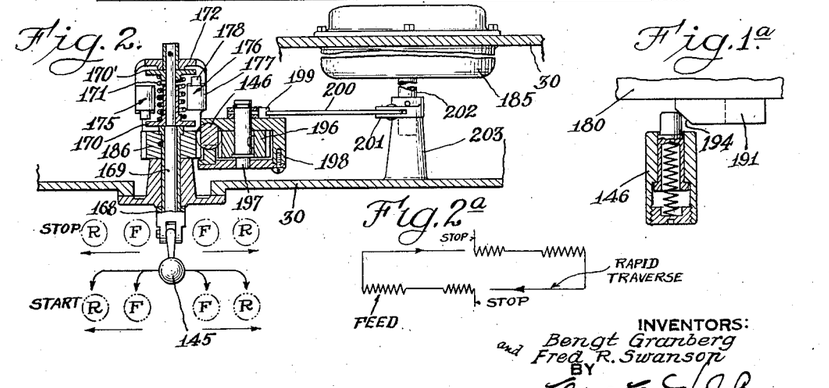
Fig. 1a is a plan view of one of the control dogs showing its relationship to the control plunger.
Fig. 2 is a fragmentary section along the line 2—2 of Fig. 1.
Fig. 2a is a diagrammatic view illustrating one cycle of support movement which may be obtained in the machine.
Figure 3:
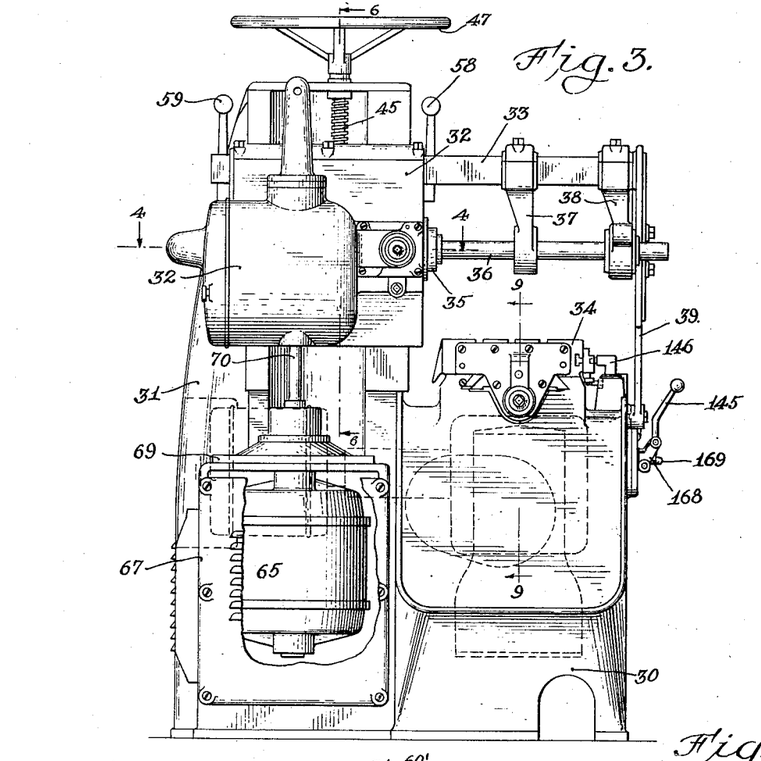
Fig. 3 is a side elevation with a part broken away to illustrate the spindle driving motor.
Figures 16, 17, 18, 19:
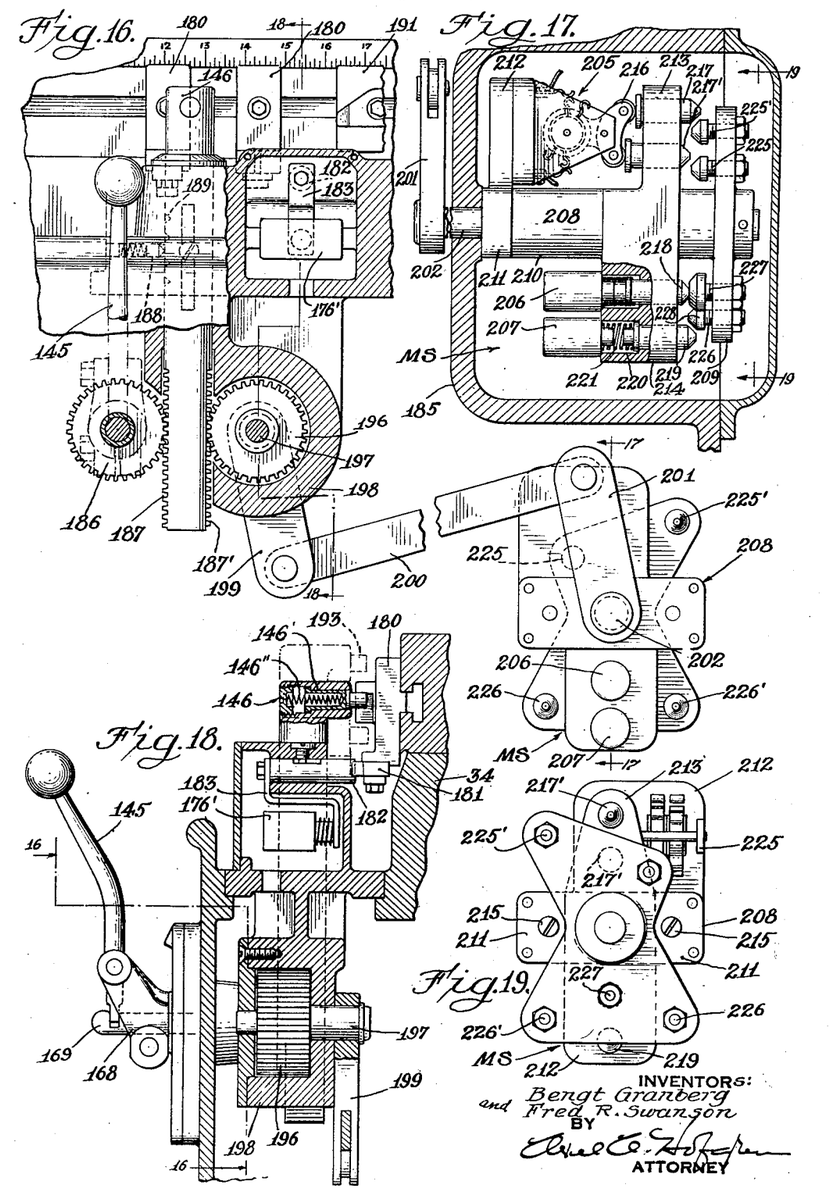
Fig. 16 is an enlarged fragmentary front elevational view, partly in section, along the line 16—16 of Fig. 18.
Fig. 17 is a vertical section along the line 17—17 of Fig. 16.
Fig. 18 is a vertical section along the line 18—18 of Fig. 16.
Fig. 19 is a view along the line 19—19 of Fig. 17.

For controlling the direction and rate of movement of the table a master switch mechanism MS is mounted in a casing 185 adjacent to the rear of the base, and is arranged for actuation either manually by movement of the control handle 145, or automatically by vertical shifting of the control member 146 by suitable dogs on the table. As shown in Figs. 1, 2 and 16, the control handle 145, in addition to its pivotal movement from front to rear, may be shifted to the right or left, so as to rotate the sleeve 168, and in such rotation, the control member 146 is moved correspondingly up or down by virtue of a pinion 186 fixed on the sleeve 169 and engaging a rack 187 formed on the control member. A spring-pressed plunger 188 (Fig. 16) engages with spaced notches 189 on the control member to hold said member as well as said control handle in any one of four control positions.

For automatically actuating the control member 146, a plurality of reversing dogs 190, traverse dogs 191, and feed dogs 192 are secured in predetermined positions along the front of the table to engage with their sloping cam surfaces 193' a horizontally projecting arm or plunger 193 on the upper end of the control member, so as to shift the member up or down a predetermined distance as governed by the length and position of the cam surfaces 193' on the dogs. By proper arrangement of the dogs, the control element may be shifted at will between any of its four control positions to obtain the cycle desired for the table.

The various control dogs are intended for operation in one direction only, and to render them inoperative in the other direction the horizontal plunger 193 is mounted for reciprocation in a horizontal bore 146' in the control member 146 (Fig. 18). A coil spring 146'' confined within the bore urges the plunger 193 to its extended position wherein it may be engaged by cam surfaces 193' to actuate the control member in one direction of table movement, and in the other direction of movement beveled edges or surfaces 194 on the dogs 190, 191 and 192 engage the plunger 193 to press the plunger back into its bore and thereby allow the control member to skip over the dogs without disturbing the position of the associated control mechanism.

With the control mechanism herein illustrated, the control handle 145 by its right or left hand movement indicates the resulting direction of movement of the table, and, in its movement in either direction from the centered position of Fig. 2, moves successively to feed and rapid traverse positions as indicated by the letters F and R adjacent the handle 145 in Fig. 1. While in any of its right or left hand positions, the handle 145 may be pivoted manually to actuate the starting switch 175 or the stop switch 176.

In the movement of the control handle 145 or the control member 146, the master switch MS is correspondingly actuated by means of a mechanical connection comprising a pinion 196 fixed on a rotatably mounted stub shaft 197 and engaging a rack 187' formed on the control member 146. The stub shaft 196 is journaled in a housing 198, and on its projecting end carries a depending arm 199 which is connected by a link 200 to an arm 201 fixed on the projecting forward end of a horizontal shaft rotatably journaled in the master switch housing 185. As shown in Fig. 2, the forward end of the shaft 202 is journaled in a hub 203 on the forward wall of the bed.

As illustrated in Figs. 16, 17 and 19, the master switch mechanism MS comprises a reversing switch 205, a feed control switch 206 and a rapid traverse control switch 207, all carried by a fixed mounting bracket 208 within the casing 185, and arranged for actuation by rotative movement of a control plate 209 fixed to and rotated by the shaft 202. The mounting bracket 208 as illustrated comprises an elongated bearing sleeve 210 with three arms 211 and 212 at one end, and a pair of oppositely extending arms 213 and 214 at the opposite end. The arms 211 are secured by screws 215 to the casing 185 so that the shaft 202 extends through the sleeve, while the reversing switch 205 is mounted on the arm 212 so as to project toward the arm 213 at the other end of the sleeve. A rocking lever 216 forming part of the reversing switch 205 has its opposite ends positioned adjacent to a pair of plungers 217, 217' slidably mounted in the arm 213 so that the switch may be reversed by alternate actuation of the plungers.

In the arm 214 of the bracket, a pair of similar actuating plungers 218 and 219 are slidably mounted for engagement respectively with the feed and traverse control switches 206 and 207 to close the same. The switches 206 and 207 are mounted on the arm 214 on the side opposite the control plate 209, with their push buttons extending into bores 220 in the arm 214 in alinement with the plungers 218 and 219 respectively. Within each bore 220 a coil spring 221 is positioned to urge the plungers 218 and 219 away from their switches and project the opposite ends toward the control plate 209.

On the control plate 209, a plurality of cam studs 225, 225', 226, 226' and 227 are adjustably mounted, each having a head 228 tapered or beveled at its outer end and adapted in the movements of the control plate to have cam engagement with the pointed adjacent ends of the switch actuating plungers on the mounting bracket. As shown in Figs. 16 and 19, the stud 225 is adapted when the control handle is moved to the right in Fig. 16, to engage the plunger 217 to establish in part a circuit to the forward contactor coil FCC as will hereinafter be described, while the stud 225', in opposite or left hand movement of the control handle, engages the plunger 217' to reverse the switch 205 and establish in part a circuit to the reverse contactor coil RCC.

The stud 227 as shown in Figs. 17 and 19 has a relatively large head 228 which engages the plunger 218 to close the feed control switch 206 while the feed control handle is moved to either of its two feed positions, while the studs 226 and 226' engage selectively with the plunger 219 of the traverse control switch 207 when the control handle is in either of its traverse positions.

As illustrated in Fig. 20, the various control switches above described are inter-connected to give a coordinated and convenient control for the machine as a whole. Generally considered, the control circuits include a normally open two-pole control contactor 230 with an operating coil 231 in the starting circuit, which contactor functions to shunt the starting switch 175 after momentary closure thereof; a normally open single-pole contactor 235 having an operating coil 236 governed by the traverse switch 207 and operable to control the circuit to the traverse solenoid; and a normally open single-pole contactor 238 having an operating coil 239 governed by the feed switch 206 to control the circuit to the feed coil 139 of the feed solenoid.

When the starting switch 175 is closed by the control handle 145 to initiate movement of the table, a circuit is established to the coil 231 of the control contactor 230 so as to close switches 230' and 230'' thereof, said starting circuit comprising wire 240 connecting the third stationary line element of the spindle contactor SC (which is connected by wires 163'' and 150 with the line wire L—1) with one contact of the normally closed master stop switch 176''. A wire 241 connects the other terminal of the switch 176'' with one contact 242' of a switch 242. The switch 242 has a pair of normally open contacts 242', 242'', and a pair of normally closed contacts 243' and 243", and is mounted on the push button station PBS for actuation to initiate spindle rotation in a manner which will hereinafter be described.

A wire 244 connects the contact 242' with one stationary contact 245' of a switch 245, which switch has a pair of stationary contacts 245' and 245", and a pair of stationary contacts 246' and 246". The movable element of the switch 245 is connected to the spindle contactor SC so as to close the contacts 246', 246" when the contactor is open, and to bridge the other pair of contacts when the contactor is closed. Between the contact 245' and one stationary contact of the stop switch 176 a wire 247 extends, while a wire 248 connected to the same contact of the switch 176 forms an extension to one stationary contact of the starting switch 175.

From the other stationary contact of the switch 175 a wire 249 extends to the movable contact of the switch 230" of the control contactor 230, and an extension 250 from said movable contact continues the circuit to one end of the operating coil 231. A wire 255 connects the other end of the coil 231 to one end of the coil 236 of the rapid traverse contactor, and an extension from the same end of the coil 236 to one end of the coil 239 of the feed contactor 238 is provided by a connection 256. A wire 257 continues the circuit to one end 258 of the spindle contactor coil SCC.

The remainder of the starting circuit, at certain times constitutes a part of the holding circuit for the spindle contactor coil SCC and the forward and reverse contactor coils FCC and RCC, and it is therefore arranged through trip switches 260 and 260' on the overload relays 151, 151" and 164, 164" respectively, so that if either the spindle motor or the feed motor stops due to overload, the other motor will also be stopped. Thus a wire 261 forms an extension of the circuit from the end 258 of the spindle contactor coil SCC to one contact of the overload switch 260', while a wire 262 extends from the other switch contact to one contact of the overload switch 260. From the other contact of the switch 260 a connection 263 extends to the stationary contact of the second line element of the reverse contactor RC, thereby completing through wire 150' the circuit to the line wire L—2.

Having thus completed a starting circuit by closure of the starting switch 175, the control contactor coil 231 is energized to close the switches 230' and 230" thereof, which switches serve to shunt the starting switch 175 and establish a circuit to either the forward contactor coil FCC or the reverse contactor coil RCC through the reversing switch 205 in the following manner. Bearing in mind the connection of the wire 247 with one stationary contact of the stop switch 176, it will be seen that a wire 270 connects the other stationary contact of the switch 176 with one stationary contact of the stop switch 176', while wires 271 and 272 connect the other stationary contact of the switch 176' with the stationary contacts of the control contactor switches 230" and 230'. From the movable contact of the switch 230' a wire 273 extends to one stationary contact of the traverse control switch 207, which contact is connected by a wire 274 to one of the stationary contacts of the feed control switch 206. Said stationary contact of the feed control switch 206 is connected by a wire 275 to the movable or common contact of the reversing switch 205 which by its position determines the remainder of the circuit. Thus a wire 276 connects one stationary contact of the reversing switch 205 with one end of the forward contactor coil FCC, while a wire 277 extends from the other stationary contact of the switch 205 to one end of the reverse contactor coil RCC. A wire 278 connects the other ends of the forward contactor coil FCC and the reverse contactor coil RCC, and a wire 279 from said other end of the reverse contactor coil RCC forms an extension of the circuit to the end 258 of the spindle contactor coil SCC, from which point the circuit is completed to the line wire L—2 by wire 261, switch 260', wire 262, switch 260 and wires 263 and 150'.

Thus, depending upon the position of the reversing switch 205, either the forward contactor or the reverse contactor is closed to start the feed motor 85 in the desired direction.

Closure of the starting circuit also serves to establish a circuit through the spindle contactor coil SCC. For this purpose, a wire 280 connects the movable contact 230" with the contact 243' of the switch 242. A wire 281 connects contacts 243" and 246', while a wire 282 connects the contact 246" with the contact 245". Between the contact 245" and the end 258' of the spindle contactor coil SCC a wire 283 is connected. Thus a circuit is established through the coil SCC to close the contactor SC, and upon movement of the switch 245 by the spindle contactor, to bridge the contacts 245', 245" a holding circuit for the spindle contactor coil is established.

If at the same time the traverse switch 207 is in its closed position, a circuit is established through the traverse contactor coil 236 by wires 285 and 286 which connect the other stationary contact of the switch 207 with the movable contact of the traverse contactor and the other end of the coil 236 in series. Upon closure of the traverse contactor 235, a shunt circuit is established through wire 287 which is connected to one end of the traverse coil 138, and a wire 288 which connects the other end of the coil at the junction of the wire 277 and the feed contactor coil FCC. Preferably the traverse contactor is of a time delay construction so that ample time will be allowed for the reversal of the feed motor before the traverse drive connection is established.

If, however, the feed switch 206 is in its closed position at this time, a circuit is established to the feed control contactor coil 239. This circuit preferably includes a three-pole feed selector switch 290 through the medium of which the feed control contactor may be disabled in either direction of movement of the table. Thus the common contact of the switch 290 is connected by a wire 291 to one end 292 of the feed contactor coil 239, while wires 293 and 294 connect the stationary contacts of the switch each to one stationary contact of switches 295 and 296 which are actuated by the forward contactor FC and the reverse contactor RC, respectively. A wire 297 connects the other stationary contact of the switches 295 and 296, while a wire 298 provides an extension of the connection to the other stationary contact of the feed control switch 206. The switches 295 and 296 are arranged to be opened when their contactors are open, and to be closed when their contactors are closed, and thus if both movable contacts 290' and 290" of the switch 290 are closed, the feed contactor is closed when either of the switches 295 or 296 are closed. If, however, the movable contact 290' is open, the circuit to the feed control contactor can not be closed during reverse movement of the support; and the same result may be attained in forward movement of the support by opening of the switch contact 290″.

When the feed contactor 238 is closed, a circuit is established through the feed solenoid 139 by means comprising a wire 292′, extending from the end 292 of the feed contactor coil 239 to the movable contact of the contactor 238, a wire 299 extending from the stationary contact of the contactor 238 to one end of the feed coil 139, and a wire 300 connecting the other end of the coil 139 to the wire 288 at the adjacent end of the traverse coil.

Coolant is supplied to the cutter during feeding movement of the support by means including a pump-actuating motor 305 (Fig. 20). Operation of the pump motor is controlled initially by a pump control switch 306 on the remote control station PBS, and is inter-related to the feeding mechanism and to the operation of the table feed motor 85 so as to operate only during feeding movement of the support, and so as to stop when the table motor 85 is stopped. Thus a wire 307 is connected at the junction of overload relay 151 and wire 156, and extends to one contact of the pump control switch 306, while a wire 308 connects the other contact of the switch 306 to one terminal of the motor 305. Between the wire 300 and the other terminal of the motor 305, wires 309 and 310, and a normally open switch 311 are connected in series. As shown in Figs. 12 and 20, the switch 311 is closed when the feed solenoid 139 is actuated, the switch 311 being mounted in the casing 86 in the path of the upper end of the rack 141.

With the wiring arrangement described, the switch 242 on the station PBS may be actuated to start the spindle motor 65 without starting the feed motor. In this action a starting circuit is established as follows: Line L—1, wires 150, 163″ and 240, switch 176″, wire 241, switch 242, and contacts 242′ and 242″, wire 315, which connects contacts 242″ and 243″, wire 281, switch 245 and its contacts 246′ and 246″, wires 282 and 283, spindle contactor coil SCC, wire 261, switch 260′, wire 262, switch 260, and wires 263 and 150′ to line L—2. Upon closure of the spindle contactor the contacts 245′ and 245″ are bridged by the movable switch member 245, thereby closing a holding circuit to the spindle contactor coil SCC through the master stop switch 176″ which may be actuated or opened to stop the spindle.

*Operation*

In the operation of the machine, spindle rotation and support movement are initiated by forward pivotal movement of the manual control handle 145 which acts to complete a starting circuit to the control relay 230. Upon closure of the control relay, a holding circuit is established through its actuating coil, and in addition, circuits are established to the spindle contactor coil, the forward or reverse contactor coils, and to the feed or traverse contactor coils as determined by the position of the master switch. The position of the master switch may, of course, be varied by pivoting the control handle to the right or left. When the various contactors selected by the setting of the master switch have closed, circuits are established to the associated motors or solenoids. If, for example, the master switch is set by the control handle for feeding movement of the support to the left, the reverse contactor and the feed contactor will be actuated to cause, respectively, reverse rotation of the feed motor and actuation of the feed solenoid.

Through its cam mechanism, the feed solenoid then acts to open the traverse clutch and engage the feed clutch so as to cause movement of the support to the left (Fig. 1) at feeding speed, the direction of movement, of course, being determined by the direction of rotation of the feed motor. If the pump control switch 306 is in its closed position, this actuation of the feed solenoid also serves to complete a circuit to the pump motor by closure of the normally open switch 311. This switch opens immediately upon actuation of the rapid traverse solenoid; and in addition, the circuit to the pump motor is interconnected with the feed motor circuit so as to be supplied with current only during operation of the feed motor.

As the support moves to the left at feed speed, the right hand traverse dog 191 (Fig. 1) engages the control element 146 to shift the master switch and thereby break the circuit to the feed contactor 238 and establish a circuit to the traverse contactor 235 so as to energize the traverse solenoid. The feed-traverse clutch is thereby shifted and the pump motor circuit broken, and the support continues its movement to the left at traverse speed until the approaching feed dog 192 actuates the control element.

The resulting shift of the feed-traverse clutch reduces the speed of the support and coolant is again supplied during such feeding movement, until the reversing dog 190 depresses the control element to its right hand traverse position. This action shifts the master clutch so as to break the circuit to the reverse contactor coil and establish a circuit to the forward contactor coil, and thereby reverse the feed motor. Simultaneously the rapid traverse contactor coil 236 is energized, but since this contactor is of the time delay type, the energizing and actuation of the traverse solenoid is delayed until the reversal of the motor has taken place. Rapid movement of the support to the right then takes place until the stop dog 180 (left hand one in Fig. 1) engages the plunger 182 so as to open the stop switch 176′ and thereby break the holding circuit to the control relay and the various contactor coils. With the dog setting of Fig. 1, a similar working cycle of the support may be obtained in the other direction as illustrated in Fig. 2ª, such cycle being initiated by movement of the control handle to the right to determine the direction, and forwardly to close the starting circuit.

During any of the movements of the support, the machine may be stopped by manual depression of the master stop switch on the remote control panel, or by rearward actuation of the manual control handle.

In operation of the machine as above described, the starting of the spindle is inter-related with the starting of the feed motor, but by actuation of the switch 242 of the remote control station, a circuit may be established which actuates the spindle contactor independently of the other contactors. As an incident to such actuation of the spindle contactor, a holding circuit is established therefor through the master stop switch of the remote control panel, which switch may be opened to stop the spindle motor.

By inter-relating the holding circuits of the spindle contactor and the forward and reverse contactors with the overload relays of both motors an interlock is provided through which stopping of one motor due to overload causes immediate stopping of the other motor.

If it is desired to prevent actuation of the feed solenoid when the support is moving in one direction or the other, the corresponding one of the feed selector switches is opened. Since the feed selector switches comprise part of the circuit to the feed relay selectively in accordance with the open or closed condition of the forward and reverse contactors, the completion of the circuit to the feed relay is prevented during movement of the support in the selected direction.

We claim as our invention:

1. A machine tool comprising, in combination, a base, a reciprocable support mounted thereon, electric motor means for reciprocating said support at feed and traverse speeds, control mechanism including a master switch for governing the direction and speed of movement of said support by said motor means, a shiftable control element mounted adjacent to said support and connected to said master switch to actuate the same, dogs mounted on said support operable in the movement of said support to shift said control element, a control handle mounted for movement in two planes, means connecting said handle with said control element whereby movement of said handle in one of said planes serves to shift said element, and switch means associated with said control mechanism and operable by said handle when shifted in opposite directions in the other of said planes selectively to start or stop said motor means.

2. A machine tool comprising, in combination, a base, a reciprocable support mounted thereon, electric motor means for reciprocating said support at feed and traverse speeds, control mechanism including a master switch for governing the direction and speed of movement of said support by said motor means, a shiftable control element mounted adjacent to said support and connected to said master switch to actuate the same, dogs mounted on said support operable in the movement of said support to shift said control element, a control handle mounted for movement in two planes and having connection with said control element whereby movement of said handle in one of said planes serves to shift said element, said connection also serving to transmit movement from said element to said handle whereby the position of said handle in said one of said planes serves to indicate the position of said element and the setting of said master switch, and switch means associated with said control mechanism and operable by said handle when shifted in opposite directions in the other of said planes selectively to start or stop said motor means.

3. A machine tool comprising a bed having a reciprocable support thereon, motor actuating means for reciprocating said support at feed and traverse speeds and adapted to be started and stopped to start and stop the support, electrically controlled means for determining the rate and direction of movement of said support and including a plurality of control switches, a shiftable member having cam elements thereon adapted in different predetermined positions of said member to actuate said switches in different predetermined combinations which determine the rate and direction of movement of the support, manually shiftable control means connected to said cam member for shifting the same, a plurality of dogs on said support certain ones of which are adapted to shift said control means and the associated cam member, manually operable means for starting said motor actuating means to move said support at the speed and in the direction determined by the position of said cam member, and means adapted for actuation by one of said dogs to stop said motor means and said support while said cam member maintains the position occupied prior to such stopping.

4. A machine tool comprising, in combination, a bed, a support reciprocable thereon, reversible motor actuating means for reciprocating said support at feed and traverse speeds, and adapted to be started and stopped to start and stop said support, and to be reversed to reverse the direction of movement of the support, electrical control means for said actuating means to determine the speed and direction of movement of said support and including a plurality of control switches, a single shiftable member for actuating said plurality of control switches, a plurality of dogs carried by said support, dog-operated means for shifting said switch-actuating member, manually operable means for starting said motor means to move said support in the direction and at the speed determined by the position of the switch actuating member, and switch means adapted for actuation by one of said dogs independently of said switch control member to stop said support.

5. A machine tool comprising, in combination, a base, a support reciprocably mounted thereon, an electric motor adapted to actuate said support at feed and traverse rates, to be started and stopped to start and stop the support and to be reversed to reverse the direction of movement of the support, a plurality of electric control means having electric control circuits each including a switch and operable to start and stop said motor and to determine the direction and rate of support movement, and a single control handle having connections for actuating all of said switches thereby to prevent improper actuation of the switches.

6. A machine tool comprising, in combination, a bed, a support reciprocable thereon, an electric motor adapted to actuate said support at feed and traverse rates, to be reversed to reverse the direction of movement of the support and to be started and stopped to start and stop the support, a plurality of control dogs mounted on said table, a shiftable control handle, a shiftable control element adapted for actuation by certain of said dogs between a plurality of control positions, a plurality of control devices having control circuits including switches for governing the direction and rate of movement of the support, said switches being connected for automatic actuation by said control element or for manual actuation by said handle, a pair of stop switches each connected in controlling relation to said motor to stop the motor when actuated, one of said switches being mounted for automatic actuation by one of said dogs, and the other being mounted for manual actuation by said control handle.

7. A machine tool comprising, in combination, a base, a support reciprocable thereon, electric motor means for reciprocating said support at feed and traverse speeds, control mechanism for said actuating means including primary control circuits including primary control switches for starting and stopping said support, and secondary control circuits including master switch means for governing the direction and speed of support movement, a shiftable control element mounted adjacent to said support and operable to control the master switch of said secondary circuits, dogs on said support for shifting said element, a dog on said support operable upon one of said primary switches to stop said support, and manually operable means controlling one of said primary switches for starting said support.

8. A machine tool comprising, in combination, a bed, a support reciprocable thereon, electric motor means for actuating said support at feed and traverse speeds and adapted to be started and stopped to start and stop said support, electric control mechanism including a plurality of electric control circuits for starting and stopping said motor means and for controlling the direction of actuation of said support, means for supplying coolant including an electric motor, and an electric circuit for controlling said motor controlled by said mechanism to cause operation of said coolant motor only during operation of said motor means to drive said support at feeding speed.

9. A machine tool comprising, in combination, a bed, a support reciprocable thereon, electric motor means for actuating said support at feed and traverse speeds, a control element positioned adjacent to said table and adapted to be shifted between a plurality of control positions, control mechanism including a plurality of electric circuits associated with said element to control the direction and rate of actuation of said support in accordance with the position of said element, a plurality of control dogs on said table for actuating said element, means for supplying coolant, and an electric circuit associated with said mechanism for controlling said coolant supply means and arranged to cause operation of the coolant supply means during movement of the support at feed speed and to prevent operation of said means at other times.

10. A machine tool having, in combination, a bed, a column upstanding from said bed, a spindle rotatable in said head, a spindle-driving motor supported beneath said head and beside said column with its axis vertically positioned, a drive shaft supported and driven by said motor and having a splined portion extending vertically through said head, and spindle-driving reduction gearing mounted in said head and driven through constant connection with said splined portion of said shaft.

11. A machine tool having, in combination, a movable support, means for moving said support including a clutch, means for shifting said clutch to its engaged position comprising a cam follower connected to the clutch, an electric solenoid, and a cam actuated by said solenoid and having a leading surface thereon adapted to engage said follower when said solenoid is energized to close said clutch, and a merged dwell surface arranged to be engaged with said follower during the terminal portion of the solenoid actuation to maintain the clutch in closed position.

12. A machine tool having a frame, a support reciprocable on said frame, means for actuating said support at feed and traverse rates, a control element for said actuating means mounted on said frame adjacent to said support for reciprocation between a plurality of control positions, a spring loaded plunger reciprocably mounted on said element transversely thereof and urged from an inactive retracted position to an active projecting position, and a plurality of dogs mounted on said support for actuating said control element, each of said dogs having a control cam surface facing in one direction for engagement with said plunger to actuate said control element between its control positions and each of said dogs having a beveled surface facing generally in the opposite direction for camming said plunger to its retracted position.

13. A machine tool comprising, in combination, a base, a support reciprocably mounted thereon, electric motor actuating means for reciprocating said support at feed and traverse speeds, electrical governing means for said actuating means, and a single control operable manually to start and stop said support and operable either manually or automatically to determine the rate and direction of movement of said support.

14. A machine tool comprising, in combination, a base, a support reciprocably mounted thereon, electric motor actuating means for reciprocating said support at feed and traverse speeds, electrical governing means for said actuating means, a single control element operable manually to start and stop said support and operable either manually or automatically to determine the rate and direction of movement of said support, and means independent of said control unit operable automatically to stop said support.

15. A milling machine comprising, in combination, a base, a support reciprocably mounted thereon, an electric motor, transmission means interposed between said motor and said support to actuate said support at feed and traverse rates, a spindle over said support, means for actuating said spindle, and electric control means including a single control element operable manually to start and stop said support and start said spindle and operable either manually or automatically to determine independently the rate or direction of movement or both of said support.

16. A milling machine comprising, in combination, a base, a support reciprocably mounted thereon, an electric motor, transmission means interposed between said motor and said support to actuate the same at feed and traverse rates, a spindle over said support, means for actuating said spindle, electric control means including a single control unit operable manually to start and stop said support and start said spindle and operable either manually or automatically to determine independently the rate or direction of movement or both of said support, and a control switch independent of said unit adapted to be actuated to start said spindle only.

17. A machine tool comprising, in combination, a base, a support reciprocably mounted thereon, electric motor actuating means for reciprocating said support at feed and traverse speeds, the motor of said actuating means being reversible to reverse the direction of support movement, and electrical control means for said actuating means comprising a plurality of switches for determining the direction and rate of support movement, a single member for mechanically actuating said plurality of switches, a single control contactor for completing a circuit to all of said plurality of switches, and means manually operable to start or stop said support and manually or automatically operable to stop said support and to determine the rate and direction of support movement.

18. A machine tool comprising, in combination, a base, a support reciprocably mounted thereon, electric motor actuating means for reciprocating said support at feed and traverse speeds, the motor of said actuating means being adapted to be started and stopped to start and stop said support and to be reversed to reverse the direction of movement of said support, and electrical control means for said actuating means comprising an operating circuit having a plurality of switches for controlling the direction and rate of movement of said support, a control contactor having a single switch operable to complete said operating circuit to all of said switches, a manually actuated switch operable to complete a starting circuit for initially energizing the coil of said control contactor, and a holding circuit for said coil completed upon the energization thereof.

19. A machine tool comprising, in combination, a base, a support reciprocably mounted thereon, electric motor actuating means for reciprocating said support at feed and traverse speeds, and electrical control means for said actuating means comprising a single control contactor, a starting circuit including a coil for actuating the control contactor and a manually operable switch, a holding circuit for said control contactor coil completed upon the energization of said coil, and an operating circuit completed by said contactor upon the energization of said coil and including a feed switch and a rapid traverse switch for obtaining feed or rapid traverse movement of said support respectively with the closure of said feed switch or said rapid traverse switch.

20. A machine tool comprising, in combination, a base, a support reciprocably mounted thereon, electric motor actuating means for reciprocating said support at feed and traverse speeds, the motor of said actuating means being adapted to be started and stopped to start and stop said support and to be reversed to reverse the direction of movement of said support, and electrical control means for said actuating means comprising an operating circuit having a reversing switch, a feed switch and a rapid traverse switch connected in parallel, a control contactor having an energizing coil, a starting circuit including said energizing coil and a manually actuated switch, and a holding circuit including said energizing coil, said control contactor having a switch operable upon energization of the coil to complete said holding circuit and a switch in series with said reversing, feed, and traverse switches to complete the operating circuit.

21. A machine tool comprising, in combination, a base, a support reciprocably mounted thereon, a reversible electric motor for actuating said support, said motor being adapted to be started and stopped to start and stop the support and to be reversed to reverse the direction of movement of the support, a transmission interposed between said motor and said support shiftable to feed or traverse positions to obtain feed or traverse movement of said support, electrical means for determining the direction of rotation of said motor including energizing coils, electrical means for shifting said transmission including a feed solenoid and a traverse solenoid, and a control circuit for said electrical means comprising a reversing switch, a feed switch, and a traverse switch connected in parallel with one another and in series respectively with the energizing coils, the feed solenoid, and the traverse solenoid, a control contactor having a switch connected in series with the plurality of parallel connected switches and a switch for establishing a holding circuit therefor, and manually operable switch means for initially energizing the coil of said control contactor and for breaking said holding circuit.

22. A machine tool comprising, in combination, a base, a support reciprocably mounted thereon, electric motor actuating means for reciprocating said support at feed and traverse speeds, electric governing means for said actuating means, and a single control operable manually to start and stop said support and operable either manually or automatically to determine the rate and direction of movement of said support, said control being adapted to be grasped in the hand of an operator of the machine, and to be shifted to stop or start said support, or to determine the rate and direction of movement of said support while the operator's hand remains in the original position on said control and without necessitating removal or shifting of the hand.

23. A machine tool comprising, in combination, a base, a reciprocable support mounted thereon, electric motor means for reciprocating said support at feed and traverse speeds, control mechanism for governing the direction and speed of movement of said support by said motor means, a control handle mounted for movement in two planes, means connecting said handle with said control mechanism whereby movement of said handle in one of said planes serves to shift said mechanism, and switch means associated with said control mechanism and operable by said handle when shifted in opposite directions in the other of said planes selectively to start or stop said motor means.

24. A machine tool comprising, in combination, a bed, a support reciprocable thereon, reversible motor actuating means for reciprocating said support at feed and traverse speeds and adapted to be started and stopped to start and stop said support and to be reversed to reverse the direction of movement of the support, electrical control means for said actuating means to determine the speed and direction of movement of said support including a reversing switch, a feed switch, and a traverse switch, a single shiftable member for actuating said switches to predetermine the direction and rate of actuation of said motor actuating means, automatic and manual means for shifting said switch actuating member to predetermine the direction and rate of actuation of said motor actuating means, and a manually operable means for starting said motor means to move said support in the direction and at the speed determined by the position of the switch actuating member.

25. A machine tool comprising, in combination, a bed, a support reciprocable thereon, reversible motor actuating means for reciprocating said support at feed and traverse speeds and adapted to be started and stopped to start and stop said support and to be reversed to reverse the direction of movement of the support, electrical control means for said actuating means to determine the speed and direction of movement of said support including a plurality of control switches, a single shiftable member for actuating said plurality of control switches, a plurality of dogs carried by said support, dog operated means for shifting said switch actuating member, and manually operable means for starting said motor means to move said support in the direction and at the speed determined by the position of the switch actuating member.

26. A machine tool comprising, in combination, a base, a support reciprocably mounted thereon, an electric motor for reciprocating said support, a spindle, an electric motor for actuating said spindle, and electric control means for said motors including a first switch operable manually to start said support and said spindle motor and operable either manually or automatically to determine the direction of movement of said support, and a second normally open switch in parallel with said first switch operable independently of said first switch to start said spindle motor only.

27. A machine tool comprising, in combination, a bed, a support reciprocable thereon, electric motor means for actuating said support adapted to be started and stopped to start and stop said support, transmission means interposed between said motor and said support shiftable to adapt said motor to drive the support at feed and traverse speeds, control mechanism for starting and stopping said motor and for controlling the direction of actuation of said support, electric control means for governing the shifting of said transmission, means for supplying coolant including an electric motor, and an electric circuit for controlling said coolant motor including a first switch adapted to be closed when said transmission is shifted to effect a feed rate of movement and a second switch adapted to be closed when said support motor is energized thereby to cause operation of said coolant motor only during operation of said support motor to drive said support at feed speed.

BENGT GRANBERG.
FRED R. SWANSON.